(12) United States Patent
Keller

(10) Patent No.: US 9,409,804 B1
(45) Date of Patent: Aug. 9, 2016

(54) FILTER SYSTEM FOR A FLUID

(71) Applicant: Adam John Keller, Fremont, CA (US)

(72) Inventor: Adam John Keller, Fremont, CA (US)

( * ) Notice: Subject to any disclaimer, the term of this patent is extended or adjusted under 35 U.S.C. 154(b) by 0 days.

(21) Appl. No.: 14/616,005

(22) Filed: Feb. 6, 2015

(51) Int. Cl.
*C02F 3/02* (2006.01)
*A01K 63/04* (2006.01)

(52) U.S. Cl.
CPC *C02F 3/02* (2013.01); *A01K 63/045* (2013.01)

(58) Field of Classification Search
CPC .... C02F 3/02; A01K 63/045; B01D 29/0029; B01D 29/11; B01D 29/117; B01D 29/23; B01D 29/27
USPC ......... 210/167.21, 167.22, 448; 119/259, 260
See application file for complete search history.

(56) References Cited

U.S. PATENT DOCUMENTS

| | | | |
|---|---|---|---|
| 5,571,408 A * | 11/1996 | Rising | B01D 29/27 210/167.29 |
| 5,626,747 A | 5/1997 | Ritzow et al. | |
| 6,056,886 A | 5/2000 | Hickok, Jr. et al. | |
| 6,770,194 B1 | 8/2004 | McGrath | |
| 7,618,534 B2 | 11/2009 | Mihlbauer et al. | |
| 8,034,237 B2 | 10/2011 | Happel et al. | |
| 8,132,534 B2 | 3/2012 | Arita et al. | |
| 2004/0094470 A1 * | 5/2004 | Jackson | A01K 63/045 210/411 |
| 2007/0170104 A1 * | 7/2007 | Belford | B01D 29/117 210/295 |
| 2009/0250121 A1 | 10/2009 | Kirkman | |

* cited by examiner

*Primary Examiner* — Fred Prince
(74) *Attorney, Agent, or Firm* — Thomas J. Connelly; Northwind IP Law, S.C.

(57) ABSTRACT

A filter system for filtering a fluid is disclosed which includes a sock tank fluidly connected to a baffle tank. The sock tank contains a sock filter for separating particles of a certain size from an unclean fluid. The unclean fluid can come from a container holding a large quantity of fluid, such as an aquarium. The filtered fluid from the sock tank is then routed into the baffle tank. The baffle tank has a first chamber in fluid communication with a second chamber. The first chamber contains a bacteria culture for biological filtration of the incoming fluid. First and second baffles are positioned within the first and second chambers and function to regular the flow of filtered fluid from the first chamber to the second chamber. The first and second baffles also control the fluid level in the first chamber so that the bacteria culture is fully immersed in fluid at all times. This is needed so that the bacteria culture can function properly. The filter system further includes a return conduit for routing filtered fluid from the second chamber of the baffle tank back into the container holding a large quantity of fluid.

20 Claims, 4 Drawing Sheets

FILTER SYSTEM FOR A FLUID

FIELD OF THE INVENTION

This invention relates to a filter system for a fluid, such as a filter system for the water in a fish aquarium.

BACKGROUND OF THE INVENTION

Today, there are many different applications where a fluid needs to be filtered. In many commercial, industrial, municipal and residential applications and processes, a fluid, either a liquid or a gas, needs to be filtered. The kind of fluid can vary. The fluid can be but is not limited to: fresh water, salt water, brine, an aqueous mixture, a chemical, a food mixture, a liquid mixture, milk, a juice, a soft drink, an alcohol, etc. Many municipalities have water treatment plants that filter and treat drinking water, storm water, waste streams, etc. Many homes and some small businesses have a fresh water and/or a salt water aquarium. Aquariums are manufactured in various sizes from 10 gallons to 1,500 gallons or more. Regardless of the size of the aquarium, all aquariums need the water filtered on a continuous basis.

In some of the above mentioned applications and processes, a portion of the fluid is removed from a container or tank and is routed to a filtering system where foreign particles, debris and/or waste is filtered out of the fluid. In addition, the fluid interacts with biological media to neutralize the harmful chemicals created by organisms in the aquarium. The clean fluid is then reintroduced back into the container or tank or into some part of the application or process. A home aquarium is a good example of one such application where water may be continuously filtered using a filtering system. The filtering system can be hidden from view. Water in the fish aquarium becomes tainted with food particles, algae growth, fish waste, etc. over time. A portion of this water is skimmed off from the upper surface of the water in the aquarium and is routed to a filtering system which is usually situated in a cabinet located below the aquarium or on lower level, such as in the basement. The filtering system can vary in design and construction. Usually, the filtering system has two or more compartments in which a particular filtration task is performed. The filter system can be set up to provide micro particle filtration, biological filtration and aeration.

Now, a filter system for a fluid has been invented. This filter system is especially useful for a fish aquarium. The filter system is sized to fit into a cabinet which supports the aquarium so that it is out of sight yet still provides easy access when one needs to check on the filter sock and/or the biological filer components.

SUMMARY OF THE INVENTION

Briefly, this invention relates to filter system for a fluid and is especially useful as a filter system for a fish aquarium. The filter system includes a sock tank having a top wall, a bottom wall and at least one sidewall connecting the top wall to the bottom wall to form an enclosure. The top wall has an inlet formed therethrough which is fluidly connected to a container holding a large quantity of fluid, such as a fish aquarium. An outlet is spaced apart from the inlet. A bracket is secured to an interior surface of the sock tank and a filter sock is removable attached to the bracket. The bracket positions the filter sock adjacent to the inlet to provide particle filtration of incoming fluid. The filter system also includes a first fluid connector which has a first end attached to the outlet of the sock tank and a second end. The filter system further includes a baffle tank having a bottom wall connected to at least one sidewall to form an enclosure. The baffle tank has a first chamber in fluid communication with a second chamber. The first chamber has a top wall connected to the at least one sidewall. An inlet is aligned with the second end of the first fluid connector for receiving incoming fluid in a non-sealing relationship. The first chamber contains a bacteria culture for biological filtration of the incoming fluid. The second chamber has a top wall connected to the at least one sidewall and has an outlet through which fluid can be routed back to the container holding a large quantity of fluid (the aquarium). The second chamber contains a quantity of filtered fluid. A first baffle is formed by at least a portion of the sidewall of the first chamber. The first baffle is joined to at least a portion of the sidewall of the second chamber. The first baffle extends downward from the top wall of the first chamber and has a lower end positioned above the bottom wall. A second baffle is formed in the second chamber and extends upward from the bottom wall and has an upper end positioned below the top wall of the second chamber. The lower end of the first baffle is located closer to the bottom wall than is the upper end of the second baffle. The first and second baffles allow filtered fluid from the first chamber to flow into the second chamber while controlling the fluid level in the first chamber. Lastly, the filter system includes a return conduit having a first end attached to the outlet of the baffle tank and a second end connected to the container holding a large quantity of fluid (the aquarium) whereby filtered fluid can be routed back into the container holding a large quantity of fluid (the aquarium).

A second embodiment of the filter system includes the addition of a reservoir tank having a top wall, a bottom wall and at least one sidewall connecting the top wall to the bottom wall to form an enclosure. The reservoir tank is capable of holding a larger volume of fluid that the second chamber of the baffle tank. The reservoir tank can also serve as a refugium, as a feeder fish compartment, as an evaporation tank, etc. This second embodiment also includes appropriate fluid connectors for connecting the baffle tank to the reservoir tank and for transferring the filtered fluid from the baffle tank back to the container holding a large quantity of fluid (the aquarium).

Other embodiments where a combination of two reservoir tanks are connected to the baffle tank, or a combination where a pair of sock tanks and a pair of baffle tanks are connected together, with or without a reservoir tank, can also be utilized.

The general object of this invention is to provide a filter system for a fluid. A more specific object of this invention is to provide a filter system which can be used with a fish aquarium to provide both particle filtration and biological filtration.

Another object of this invention is to provide a filter system utilizing a sock tank for particle filtration and a baffle tank, having first and second chambers, wherein the first chamber houses a bacteria culture for biological filtration and the second chamber provides a holding area for the filtered fluid.

A further object of this invention is to provide a filter system that is not sealed to outside air and which uses molded tank construction which is less susceptible to fluid leakage.

Still another object of this invention is to provide a filter system for an aquarium which is easy to assemble, which can fit into a cabinet below the aquarium so that it is out of sight, and still allow easy access when one needs to check on the filter sock and/or the biological filer components.

Still further, an object of this invention is to provide a filter system which is relatively inexpensive.

Other objects and advantages of the present invention will become more apparent to those skilled in the art in view of the following description and the accompanying drawings.

DETAILED DESCRIPTION OF THE INVENTION

Figure 1:
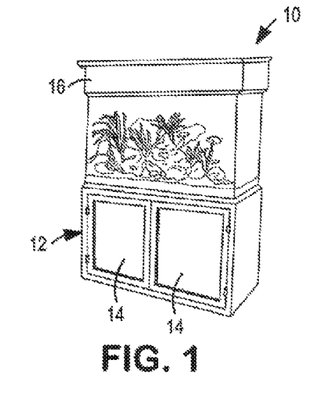
FIG. 1 is a perspective view of a fish aquarium.

Referring to FIG. 1, a container 10 capable of holding a large quantity of fluid, such as a fish aquarium, is depicted. The container 10 can be formed from any known material. When the container 10 is a fish aquarium, it is normally formed from glass or acrylic. By "aquarium" it is meant a water-filled enclosure in which living fish or other aquatic animals and plants are kept. The container (aquarium) 10 can be mounted on and/or be supported by a cabinet 12. The cabinet 12 can be stained to match ones personal decor so that it appears as a piece of furniture. The cabinet 12 can have one or more movable doors 14. The doors 14, 14 can open and close via hinges, not shown, or be arranged to slide back and forth between an open and a closed position. Other means of constructing a movable door 14 are well known to those skilled in the art. Two hinged doors 14, 14 are shown in FIG. 1. Positioned above the container (aquarium) 10 is a canopy 16. The canopy 16 finishes off the cabinet 12 and provides the cabinet 12 with the appearance of a fine piece of furniture. The canopy 16 also functions to hide various devices positioned above the container (aquarium) 10. Although such devices are not shown, they could include a light fixture, a water discharge tube, one of more water inlet tubes, etc. Alternatively, the container (aquarium) 10 could be mounted on a stand or be build into a wall.

Although the invention will be explained relative to a filter system 18 for a container 10 capable of holding a large quantity of fluid, such as a fish aquarium, it should be understood that the filter system 18 can be used in various commercial, industrial, municipal and/or residential applications and processes. The fluid can vary and can be almost any liquid or gas. By "fluid" it is meant a continuous amorphous substance whose molecules move freely past one another and that assumes the shape of its container; a liquid or a gas. The fluid can be but is not limited to: fresh water, salt water, brine, an aqueous mixture, a chemical, a food mixture, a liquid mixture, a gas, milk, a juice, a soft drink, an alcohol, etc. By "brine" it is meant water saturated with or containing large amounts of a salt, especially sodium chloride; the water of a sea or an ocean. For simplicity, the invention will be explained as filtering water that has become contaminate by food particles, algae, fish feces and/or other foreign objects in a fish aquarium 10. By "algae" it is meant any of various chiefly aquatic, eukaryotic, photosynthetic organisms, ranging from single-celled forms to the giant kelp.

Figure 2:
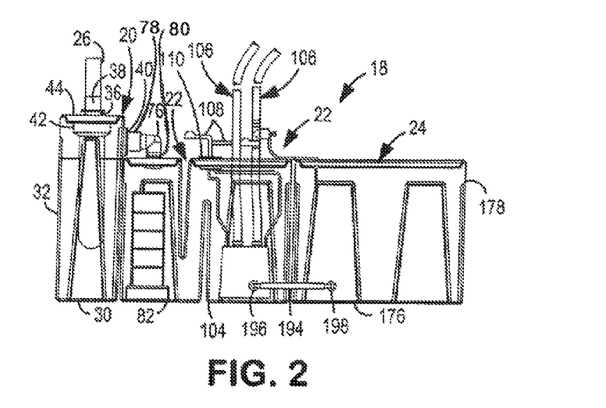
FIG. 2 is a cross-section al view of a filter system including a sock tank connected to a baffle tank which in turn is connected to a reservoir tank.

Referring now to FIG. 2, a filter system 18 is shown which includes a sock tank 20 and a baffle tank 22. An optional reservoir tank 24 is also shown. The filter system 18 also includes various fluid connectors for routing fluid to and from the filter system 18 and between the sock tank 20, the baffle tank 22 and the reservoir tank 24. All the necessary components will be explained below in detail.

Figure 3:
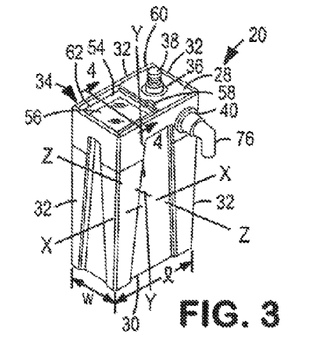
FIG. 3 is a perspective view of a sock tank.
Figure 4:
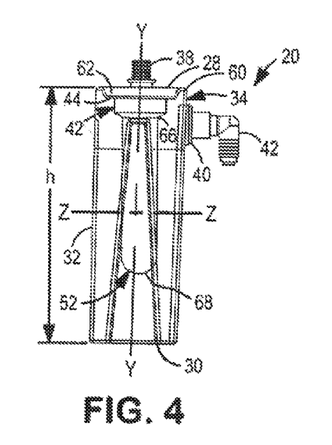
FIG. 4 is a cross-sectional view of the sock tank shown in FIG. 3 taken along line 4-4.
Figure 5:
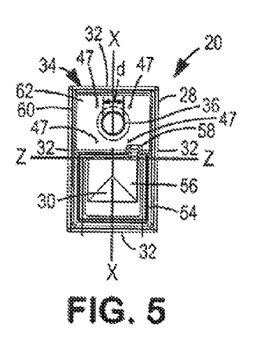
FIG. 5 is a top view of the sock tank.

Referring to FIGS. 3-5, dirty or contaminated water from the container (aquarium) 10 is routed through a discharge tube 26 to the sock tank 20. The size of the discharge tube 26 can vary. Usually, the discharge tube 26 has an internal diameter of about 4 inches or less. The discharge tube 26 can be a flexible member or a right member. Desirably, the discharge tube 26 is a flexible member such as a plastic tube. The discharge tube 26 can be constructed out of various materials well known to those skilled in the art. The unclean, dirty or contaminated water can flow downward through the flexible discharge tube 26 and into the sock tank 20 under the influence of gravity.

The sock tank 20 can vary in size, shape and configuration. The sock tank 20 should be capable of holding a predetermined volume of fluid. The sock tank 20 is an integral member. By "integral" it is meant a complete unit, a whole. The sock tank 20 can be constructed in any manner known to those skilled in the art. For example, the sock tank 20 can be molded as an integral member, can be assembled from individual parts, be cast, be carved from a single member, etc. Desirably, the sock tank 20 is molded using various molding techniques well known to those skilled in the molding arts. When molded, the sock tank 20 will exhibit a one piece design with no seams, joins or welds. This is advantageous for it eliminates the possibility of having fluid leak out of the sock tank 20. A molding apparatus that works well in molding the sock tank 20 is a rotational mold.

The sock tank 20 can be formed from various materials. Such materials can include but are not limited to: a plastic, a thermoplastic, a composite, an acrylic, glass, metal, a metal alloy, aluminum, tin, galvanized steel, copper, marine plywood, etc. The sock tank 20 can be constructed from a single material or from a combination of two or more materials. Desirably, the sock tank 20 is molded from High Density Polyethylene (HDPE). Other high density thermoplastics could also be used, such as High Density Polypropylene (HDPP). Alternatively, the baffle tank 10 can be molded from Low Density Polyethylene (LDPE), Low Density Polypropylene (LDPP). Another option is to mold the baffle tank 10 from other low or high density thermoplastics known to those skilled in the art.

Still referring to FIGS. 3-5, the sock tank 20 has a longitudinal central axis X-X, a vertical central axis Y-Y, and a transverse central axis Z-Z. The sock tank 20 also has a length l, a width w and a height h. The length l is measured along the longitudinal central axis X-X, the width w is measured along the vertical central axis Y-Y, and the height h is measured along the transverse central axis Z-Z. The length l, the width w and the height h of the sock tank 20 can vary in dimension depending upon the size of the container (aquarium) 10. Nowadays, aquariums can range from 10 gallons to 5,000 gallons or more. Many aquariums mounted on a cabinet 12 can range from 50 gallons to about 5,000 gallons. When the sock tank 20 is used as part of the filter system 18 for a container (aquarium) 10, it can have a length l of from between about 10 inches to about 50 inches, a width w of from between about 4 inches to about 25 inches, and a height h of from between about 16 inches to about 40 inches. Desirably, the sock tank 20, when used to filter water from a fish aquarium 10, has a length l of from between about 11 inches to about 30 inches, a width w of from between about 6 inches to about 15 inches, and a height h of from between about 18 inches to about 30 inches. More desirably, the sock tank 20, when used to filter water from the fish aquarium 10, has a length l of about 20 inches, a width w of about 10 inches, and a height h of about 25 inches. The sock tank 20 should be sized, shaped and configured so that it can easily fit through one of the doors 14 formed in the cabinet 12, when the container (aquarium) 10 is mounted on such a cabinet 12.

The sock tank 20 has a top wall 28, a bottom wall 30 and at least one sidewall 32 which connects the top wall 28 to the bottom wall 30 to form an enclosure 34. Since the sock tank 20 is depicted as a rectangular member, it has four sidewalls 32, 32, 32 and 32. One of the sidewalls 32 can be the front wall, another sidewall 32 can be the back wall, etc. The four sidewalls 32, 32, 32 and 32 can vary in size, shape and configuration. All of the four sidewalls 32, 32, 32 and 32 can be identical in size, shape and configuration or one or more of the sidewalls 32 can be different in size, shape and configuration. As shown, two of the sidewalls 32, 32 (the front and back walls) are of the same size and shape while the remaining two sidewalls 32, 32 are identical to one another but are smaller in size when compared to the first two sidewalls 32, 32.

It should be understood that the sock tank 20 can have one or more sidewalls 32. If the sock tank 20 had a cylindrical shape, with a circular cross-sectional diameter, then it would have a single sidewall 32. The sock tank 20 could have two sidewalls 32, 32, with each sidewall 32 being bowed outward, so that the sock tank 20 has a cross-sectional shape resembling an oval or a football. The sock tank 20 could also have three sidewalls 32, 32 and 32, with the three sidewalls arranged to give the sock tank 20 a triangular cross-sectional shape. With four sidewalls 32, 32, 32 and 32, the sock tank 20 could have a square or rectangular cross-sectional shape. With five sidewalls 32, 32, 32, 32 and 32, the sock tank 20 could have a pentagon cross-sectional shape, etc.

The bottom wall 30 can be secured to the at least one sidewall 32 in any manner known to those skilled in the art so that a water proof seal is formed. By "waterproof seal" it is meant impervious to or unaffected by water. Molding the sock tank 20 is most desirable. However, the bottom wall 30 could be secured to the at least one sidewall 32 using glue, an adhesive, a co-adhesive, a heat bond, a pressure bond, a heat and pressure bond, a weld, etc., or a combination of two or more of the aforementioned bonding techniques.

Still referring to FIGS. 2-5, the sock tank 20 has an inlet 36. The inlet 36 is shown as being formed in the top wall 28. Alternatively, the inlet 36 could also be formed in an upper portion of the sock tank 20, if desired. Desirably, the inlet 36 is formed in the top wall 28 so that if any water does leak out from this connection, it will simply pool on the top wall 28 of the sock tank 20 and then flow, via gravity, down into the sock tank 20. The size, shape and configuration of the inlet 36 can vary. Desirably, the inlet 36 is a circular opening having an internal diameter d of about 4 inches or less, see FIG. 5. An adapter 38 can be fitted to the inlet 36 and project outward therefrom. The adapter 38 is designed to be connected to the discharge tube 26 from the container (aquarium) 10. Various kinds and types of adapters 38 can be utilized, as is well known to those skilled in the art. The adapter 38 can be a slip fitting having a barbed exterior with is connected to the interior of the flexible discharge tube 26. Alternatively, the adapter 38 can be tightly or snugly fitted to the inlet 36. Other ways of attaching the adapter 38 can also be used including but not limited to a press fit, a threaded connection, a bayonet fit, etc. It should be understood that the filter system 18 does not utilize any high pressure seals that could leak over time.

The sock tank 20 also has an outlet 40 spaced apart from the inlet 36. The outlet 40 can be formed through one of the sidewalls 32. The outlet 40 should be located at a lower vertical location relative to the inlet 36. The outlet 40 can be aligned at an angle to the inlet 36. In FIG. 3, the outlet is aligned at about 90° to the inlet 36. The size of the outlet 40 can vary but generally it is about the same size as the inlet 36. As shown the outlet 40 is a circular opening having a diameter of about 4 inches or less.

Figure 6:
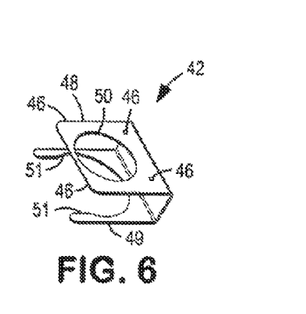
FIG. 6 is a perspective view of a bracket which is secured to an interior surface of the sock tank for holding the filter sock in alignment with the inlet.

Referring now to FIGS. 4 and 6, the sock tank 20 further includes a bracket 42 secured to an interior surface 44 of the sock tank 20. The bracket 42 can be constructed from various materials. Such materials include but are not limited to: almost any kind of plastic or thermoplastic, including high density polyethylene (HDPE), high density polypropylene (HDPP), low density polyethylene (LDPE), low density polypropylene (LDPP), polyvinyl chloride (PVC), ABS, etc. The bracket 42 can also be formed from metal, a metal alloy, aluminum, an aluminum alloy, or from some other material. A thin metal sheet that can be easily machined, punched, drilled, bent, etc. is desirable for forming the bracket 42. The bracket 42 can be formed, molded, welded, be machined or be formed some other way known to those skilled in the art.

The interior surface 44 of the sock tank 20 can be the bottom of the top wall 28. The bracket 42 is designed to be positioned adjacent to the inlet 36. The bracket 42 can vary in size, shape and configuration. The bracket 42 can be secured to the sock tank 20 by various means known to those skilled in the art. One easy way to attach the bracket 42 is to use one or more screws (not shown) that pass through one or more holes 46 formed in the bracket 42. Four small holes 46 are depicted in FIG. 6. The four small holes 46 align with four small holes 47, see FIG. 5, formed in the top wall 28 of the sock tank 20. The bracket 42 can be secured to the sock tank 20 with four screws passing through these holes 46 and 47. Alternatively, plastic rivets (not shown) can be used in place of the screws. The plastic rivets will not degrade due to the presence of water and they do not chemically affect the water.

The bracket 42 is depicted as being U-shaped with first and second, spaced apart legs, 48 and 49 respectively. A large aperture 50 is formed through the first leg 48 and a C-shaped member 51 is formed in the other leg 49. The large aperture 50 is aligned with the inlet 36 when the bracket 42 is secured to the interior surface 44 of the sock tank 20. The large aperture 50 should be larger than the internal diameter d of the inlet 36 so as not to obstruct fluid flow therethrough. The C-shaped member 51 is sized to support a sock filter 52 in a vertical orientation, parallel to the vertical central axis Y-Y. The first and second legs 48 and 49 respectively, of the U-shaped bracket 42 can be spaced apart by any desired distance. Desirably, the first and second legs 48 and 49 respectively, are spaced about 1 inch apart. This spacing is a desirable feature of the filter system 18 for it enables incoming water to bypass the sock filter 52 in the event the sock filter 52 becomes clogged.

Referring again to FIGS. 3 and 5, the top wall 28 of the sock tank 20 has an enlarged opening 54 formed therethrough. The enlarged opening 54 provides easy access to the sock tank 20 such that a person can easily pass his or her hand and/or a portion of his or her forearm into the sock tank 20. The enlarged opening 54 can vary in size, shape and configuration. The enlarged opening 54 is depicted as a square in FIGS. 3 and 5 but could be a circle or some other shape, if desired. In FIGS. 3 and 5, the sides of the enlarged opening 54 can range from between about 3 inches to about 12 inches or more when the sock tank 20 is used as part of the filter system for an aquarium 10. More desirably, each of the sides of the enlarged opening 54 is at least about 5 inches or more in dimension.

Figure 7:
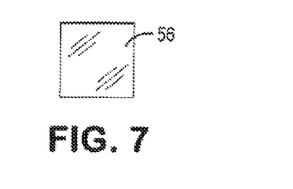
FIG. 7 is a top view of a piece of glass.

Referring now to FIG. 7, a piece of glass 56 is shown which is sized and shaped to cover the enlarged opening 54 formed in the top wall 28 of the sock tank 20. The piece of glass 56 is depicted as being square sine the enlarged opening 54 is a square shaped opening. The piece of glass 56 is removable by lifting it upward and away from the enlarged opening 54. One could use a different material other than glass, if one so desired. However, glass is a very common material that is relatively inexpensive, is resilient to water, comes in different thicknesses, can be cut into various shapes, has a certain weight to it so that it will remain in place on the top wall 28, and is washable should it get dirty.

The primary function of the piece of glass 56 is to slow down, limit or prevent evaporation of water from the sock tank 20. The filter system 18 is not a dosed, sealed unit and therefore the water is exposed to the atmosphere. This means that water, in the form of a vapor, can escape from the sock tank 20. By "vapor" it is meant the gaseous state of a substance that is liquid or solid under ordinary conditions. For many filtration systems, it is advantageous to limit evaporation so that the quantity of water in the entire system does not need to be replenished on a regular basis.

The thickness of piece of glass 56 can vary. When the sock tank 20 is used as part of the filter system 18 for a fish aquarium 10, the thickness of the piece of glass 56 can range from between about 0.125 inches to about 0.5 inches. Desirably, the thickness of the piece of glass 56 can range from between about 0.2 inches to about 0.4 inches. More desirably, the thickness of the piece of glass 56 can be about 0.375 inches.

Referring again to FIGS. 3 and 5, one can see that a finger depression 58 is formed in the top wall 28, adjacent to the enlarged opening 54. The finger depression 58 is optional but serves a very useful purpose. The finger depression 58 facilitates removal of the piece of glass 56 from the enlarged opening 54. The finger depression 58 can vary in size, shape and configuration but should be large enough to accommodate a person's index finger up to the first knuckle.

Still referring to FIGS. 3-5, one will notice that the sock tank 20 also has a rim 60 which surrounds the top wall 28. By "rim" it is meant a border, edge or margin of an object. The rim 60 functions to create a well 62 in the top wall 28. By "well" it is meant an enclosed space for receiving and holding something, such as water. The depth of the well 62 can vary. Any incoming water that does not pass through the inlet 36 but instead splashes onto the top wall 28 of the sock tank 20 can pool in the well 62. This water would then be able to flow downward into the sock tank 20 via the first finger depression 58. The piece of glass 56 can fit into the well 62.

Referring now to FIG. 4, the sock tank 20 depicts the sock filter 52 attached to the bracket 42. The sock filter 52 is designed to be easily and quickly attached and also be removed from the bracket 42. The sock filter 52 is aligned with the inlet 36 and is held stationary, in a vertical orientation, parallel to the vertical central axis Y-Y. The sock filter 52 can be inserted into and be removed from the sock tank 20 via the enlarged opening 54. The sock filter 52 is easily slid onto the C-shaped member 51 of the bracket 42.

Figure 8:
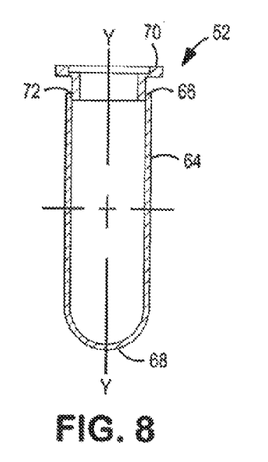
FIG. 8 is a vertical cross-section view of the filter sock shown in FIG. 4.
Figure 9:
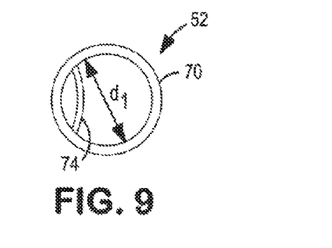
FIG. 9 is a top view of the collar to which the fitter sock is secured and the collar has a grasping member.

Referring now to FIGS. 8 and 9, the sock filter 52 is formed from a porous filter material that can filter particles of a predetermined size or larger. The openings in the porous filter material can vary. Sock filters are commercially available today with a wide range of filtering capabilities. For the filter system 18 used in a fish aquarium 10, the sock filter 52 should be formed from a porous filter material that can filter particles having a size of from between about 1 to about 500 microns or more. Desirably, the sock filter 52 can filter out particles up to about 50 microns or larger in size. More desirably, the sock filter 52 can filter out particles up to about 100 microns or larger in size. Even more desirably, the sock filter 52 can filter out particles up to about 150 microns or larger in size. Other size sock filters 52 can also be utilized, if desired. The finer the filter material, the more particles it is able to filter out of the water. A 100 micron filter can filter particles as small as 100 microns in size from the incoming water and is suitable for most fish aquariums 10.

The sock filter 52 should be constructed of a porous material known to those skilled in the art. The sock filter 52 is manufactured in the shape of a hollow, elongated tube 64 that has a first end 66 and an oppositely aligned second end 68. The first end 66 is open while the second end 68 is dosed. The hollow, cylindrical tube 64, with its closed second end 68, resembles a sock, hence the name "sock filter". The porous filter material forming the hollow, elongated tube 64 can be sewn, stitched or be secured using some other known means to acquire its shape and create the dosed end 68.

Referring to FIG. 8, the first end 66 of the hollow, elongated tube 64 can be secured to a collar 70. By "collar" it is meant any of various ring-like devices used to limit, guide or secure another part. The inner circumference of the open, first end 66 can be attached to the periphery of the collar 70 by an attachment 72. Various attachment 72 methods can be used. The attachment 72 can be but is not limited to: a pressure seal, a heat seal, a heat and pressure seal, a mechanical device, a chemical bond, an adhesive, glue, a cohesive, a combination of two different attachment elements, etc.

Referring to FIG. 9, the collar 70 is shown having an internal diameter $d_1$ that can vary. The internal diameter $d_1$ can range from between about 2 inches to about 12 inches. Desirably, the internal diameter $d_1$ of the collar 70 ranges from between about 4 inches to about 7 inches. The collar 70 can be constructed from various materials. Desirably, the collar 70 is formed from plastic since plastic is easy to mold and is relatively inexpensive. The collar 70 also contains a grasping member 74. The grasping member 74 can vary in size, shape and configuration. The grasping member 74 can be integrally formed with or be molded into the collar 70. Alternatively, the grasping member 74 can be a separate member that is joined to the collar 70. In FIG. 9, the grasping member 74 is depicted as a narrow handle that extends across a portion of the inner periphery of the collar 70. The grasping member 74 is shown having a curved shape although any desired shaped could be used. The grasping member 74 is about 3 inches long and about 0.375 inches wide. The grasping member 74 provides a prominent handle whereby a person can hold and/or carry the sock filter 52 in a vertical orientation without having to grasp the porous filter material from which the sock filter 52 is constructed.

The sock fitter 52 allows water to easily pass through the porous material from which it is formed while stopping the passage of particles which are larger than the pore size of the sock filter 52. The collar 70 is sized to easily slide into the C-shaped member 51 of the bracket 42. This arrangement allows the sock filter 52 to be quickly and easily attached to or be removed from the sock tank 20. The bracket 42 will hold and position the sock filter 52 below the inlet 36 of the sock tank 20. The incoming water will be directed into the interior of the sock filter 52 and will pass outward through the entirety of the porous filter material forming the elongated tube 64. However, the sock filter 52 is spaced about 1 inch below the inlet 36 due to the U-shaped configuration of the bracket 42. This means that a space or gap is present between the first end 66 of the sock filter 52 and the inlet 36. This is very important, for in the event that the pores of the porous filter material, from which the sock filter 52 is constructed, become dogged, the incoming water can bypass the sock filter 52 and flow or trickle over the top edge of the collar 70. This bypassed water will then be able to continue through the remainder of the filter system 18. This feature will prevent a flood from occurring or the immediate need to shut down the entire filter system 18. Many commercially available filter systems sold today do not have this feature. Closed canister filter systems do not have this capability.

The sock tank 20 serves to remove particles from the incoming water. This is important for it will prevent such particles from potentially clogging any bacteria culture that is situated downstream of the sock tank 20. A bacteria culture is used to provide biological filtration.

It should be understood that the sock tank 20 does not contain any high pressure seals that could possibly leak over time. The sock filter 52 is capable of removing micro particles from the water to improve water clarity. The sock filter 52 can be easily changed without having to turn off any water return pump. In addition, the incoming water can bypass the sock filter 52 in the event that it gets clogged without disrupting the remainder of the filter system 18.

Referring again to FIG. 2, the filter system 18 also includes a first fluid connector 76. The first fluid connector 76 has a first end 78 attached to the outlet 40 of the sock tank 20 and a second end 80. The first fluid connector 76 is hollow and can vary in size, shape and configuration. The first fluid connector 76 is depicted as an elbow although it could have some other configuration, if desired. By "elbow" it is meant something having a bend or angle similar to a person's elbow. The first fluid connector 76 can control the direction of fluid (water) flow leaving the sock tank 20.

Referring again to FIG. 2, and 10-13, the filter system 18 also includes a baffle tank 22. The baffle tank 22 is an integral member. By "integral" it is meant a complete unit, a whole. The baffle tank 22 can be constructed in any manner known to those skilled in the art. For example, the baffle tank 22 can be molded as an integral member, can be assembled from individual parts, be cast, be carved from a single member, etc. Desirably, the baffle tank 22 is molded using various molding techniques well known to those skilled in the molding arts. When molded, the baffle tank 22 will exhibit a one piece design with no seams, joins or welds. This is advantageous for it eliminates the possibility of having fluid leak out of the baffle tank 22. A molding apparatus that works well in molding the baffle tank 22 is a rotational mold.

The baffle tank 22 can be formed from various materials as where explained above for the sock tank 20. Generally, the baffle tank 22 will be molded from the same material used to mold the sock tank 20. Desirably, the baffle tank 22 is molded from High Density Polyethylene (HDPE), High Density Polypropylene (HDPP), Low Density Polyethylene (LDPE) or Low Density Polypropylene (LDPP). Another option is to mold the baffle tank 10 from other low or high density thermoplastics known to those skilled in the art.

Other high density thermoplastics could also be used, such as High Density Polypropylene (HDPP).

Figure 10:
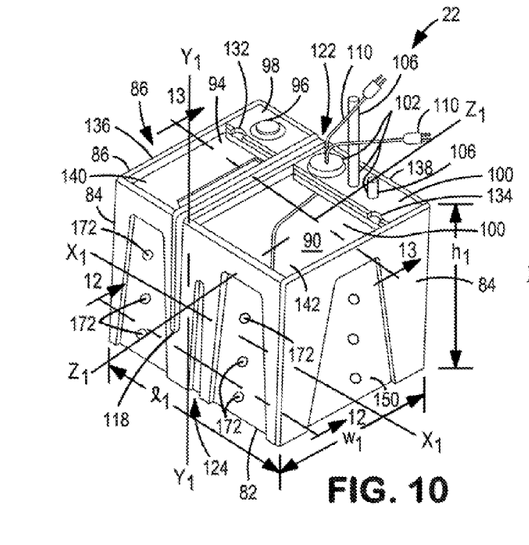
FIG. 10 is a perspective view of a baffle tank.
Figure 11:
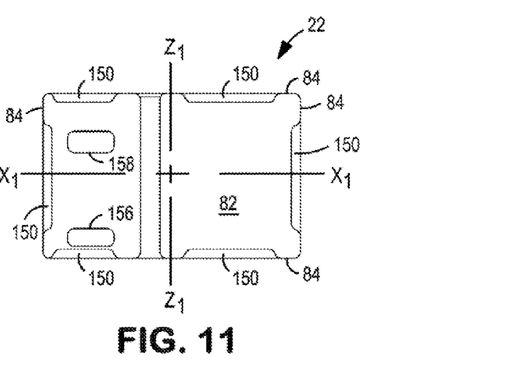
FIG. 11 is a bottom view of the baffle tank shown in FIG. 10.
Figure 12:
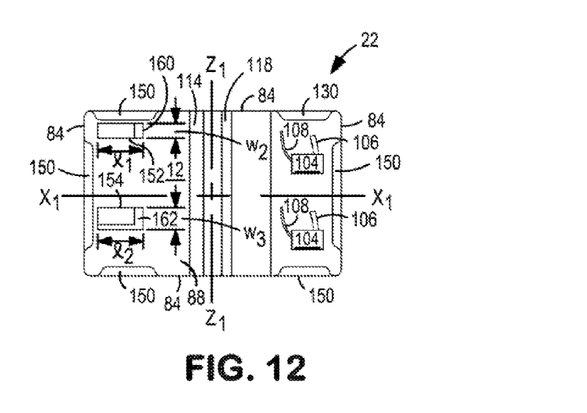
FIG. 12 is a cross-sectional view of the baffle tank shown in FIG. 10 taken along line 12-12.

Referring now to FIGS. 10-13, the baffle tank 22 has a longitudinal central axis $X_1$-$X_1$, a vertical central axis $Y_1$-$Y_1$, and a transverse central axis $Z_1$-$Z_1$. The baffle tank 22 also has a length $l_1$, a width $w_1$ and a height $h_1$. The baffle tank 22 has a bottom wall 82 secured to at least one sidewall 84 to form an enclosure 86. Four sidewalls 84, 84, 84 and 84 are shown in FIGS. 10-12 which create a rectangular shape. Any number of sidewalls 84 can be used. A single sidewall 84 would produce a circular enclosure 86 such as a cylinder. The bottom wall 82 can be secured to the at least one sidewall 84 in any manner known to those skilled in the art provided a water proof seal is formed. By "waterproof seal" it is meant impervious to or unaffected by water. Molding the baffle tank 22 is most desirable. However, the bottom wall 82 could be secured to the at least one sidewall 84 using glue, an adhesive, a co-adhesive, a heat bond, a pressure bond, a heat and pressure bond, a weld, etc., or a combination of two or more of the aforementioned bonding techniques.

The baffle tank 22 has a first chamber 88 in fluid communication with a second chamber 90, see FIGS. 10 and 12. The first chamber 88 can vary in size, shape and configuration. The first chamber 88 can be smaller, equal to or be larger in volume than the second chamber 90. Generally, the first chamber 88 is smaller in volume than the second chamber 90 when the baffle tank 22 is utilized as part of the filter system 18 for a fish aquarium 10. One reason for this it that the first chamber 88 can function to hold a high surface area, bacteria culture which can provide biological filtration while the second chamber 90 can function as a reservoir where clean water is retained until it is pumped back into the aquarium 10. A reservoir should be capable of holding a large volume of fluid, generally a greater amount, than is present in the biological filtration chamber.

The first chamber 88 has a top wall 92 with an enlarged opening 94 formed therein. The first chamber 88 also has an inlet 96 for receiving incoming fluid from the sock tank 20 in a non-sealing relationship. The size, shape and configuration of the inlet 96 can vary. Typically, the inlet 96 has a diameter of about 4 inches or less. The second end 80 of the first fluid connector 76 is connected to the inlet 96.

Still referring to FIGS. 10-13, the inlet 96 is shown being formed in and extending through the top wall 92. However, the inlet 96 could be formed in and extend through an upper portion of the sidewall 84, if desired. One advantage of forming the inlet 96 in the top wall 92 is that the connection between the first fluid connector 76 and the inlet 96 does not have to be a water tight seal. The baffle tank 22 is not designed to be part of a pressurized, dosed filtration system. This means that no water tight seals are required in the filter system 18. This is another advantage the present filter system 18 because one does not have to rely on water tight seals that can fail over time.

Still referring to FIGS. 10-12, the second chamber 90 has a top wall 98 with an enlarged opening 100 formed therein. The second chamber 90 also has one or more outlets 102. Desirably, the second chamber 90 has at least two outlets 102, 102. More desirably, the second chamber 90 has three or more, spaced apart, outlets, 102, 102 and 102. Three outlets 102, 102 and 102 are depicted in FIG. 10. Each of the three outlets 102, 102 and 102 extends through the thickness of the top wall 980. When two or more outlets 102, 102 are present, one outlet 102 can function as a fluid outlet so that the clean filtered water in the second chamber 90 can be pumped out and be directed back into the container holding a larger quantity of fluid (the aquarium 10) or into the reservoir tank 24.

Referring to FIGS. 2 and 12, a pair of electrical pumps 104, 104 is depicted positioned in the bottom of the second chamber 90. Each of the pumps 104, 104 functions to pump clean water, under pressure, out of the second chamber 90 of the baffle tank 22. The pressurized, filtered fluid (water) can then be routed back the container holding a large quantity of fluid (the aquarium) 10. The pressurized fluid can be directed through a return conduit 106 connected to the output side of each pump 104, 104. Two return conduits 106, 106 are shown since two pumps 104, 104 are utilized. Some aquariums 10 use only a single pump 104. Each return conduit 106 can be a flexible tube or hose, a rigid tube or hose or the return conduit can be hard plumbed using any material known to those skilled in the art. Each return conduit 106 can vary in diameter. Usually the diameter of each of the return conduits 106, 106 is about 0.25 inches. Each of the return conduits 106, 106 passes through one of the outlets 102, 102 and is fluidly connected at its opposite end to the aquarium 10 or to another tank. The outside diameter of each of the return conduits 106, 106 is approximately equal to the inner diameter of one of the outlets 102, 102 so as to limit or prevent evaporation of water from the second chamber 90. By "evaporate" it is meant to convert or change into a vapor.

Figure 14:
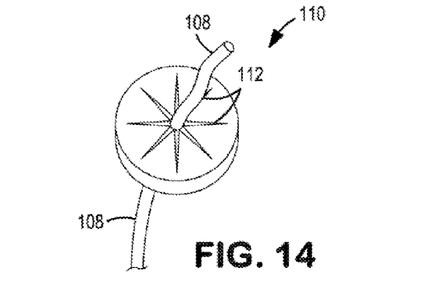
FIG. 14 is a top view of a grommet.

Referring to FIGS. 10, 12 and 14, each of the pumps 104, 104 has an electrical cord 108 that supplies electricity to operate the respective pump 104. Each of the electrical cords 108, 108 can pass through a third outlet 102. The third outlet 102 can be covered with a grommet 110. By "grommet" it is meant a reinforced member through which an electrical cord can pass. The grommet 110 can be formed from a pliable and flexible material, such as rubber. Desirably, the grommet 110 is formed as a thin rubber membrane which completely closes the outlet 102. The grommet 110, see FIG. 14, can contain one or more narrow slits 112. The slits 112 can be radially aligned like the spokes on a wheel. The slits 112 can intersect one another. The slits 112 allow each of the electrical cords 108, 108 to pass through the grommet 110. Alternatively, one or more small apertures could be formed through the grommet 110 which are sized to allow the electrical cords 108, 108 to easily pass therethrough. The grommet 110 functions to block off a substantial portion of the outlet 102. Such a design limits the amount of clean water that can evaporate from the second chamber 90.

Referring again to FIGS. 10 and 13, the baffle tank 22, as noted above, has a length $l_1$, a width $w_1$ and a height $h_1$ and each of these can vary in dimension. The length $l_1$ can range from between about 18 inches to about 30 inches when the baffle tank 22 is used as part of the filter system 18 for a fish aquarium 10. A length $l_1$ of less than about 28 inches works well when the baffle tank 22 is used as part of the filter system 18 for a fish aquarium 10. Desirably, the length $l_1$ is about 20 inches when the baffle tank 22 is used as part of the filter system 18 for a fish aquarium 10. The width $w_1$ can range from between about 10 inches to about 24 inches when the baffle tank 22 is used as part of the filter system 18 for a fish aquarium 10. A width $w_1$ of less than about 20 inches works well when the baffle tank 22 is used as part of the filter system 18 for a fish aquarium 10. Desirably, the width $w_1$ is about 16 inches when the baffle tank 22 is used as part of the filter system 18 for a fish aquarium 10. The height $h_1$ can range from between about 12 inches to about 30 inches when the baffle tank 22 is used as part of the filter system 18 for a fish aquarium 10. Desirably, the height $h_1$ can range from between about 14 to about 24 inches when the baffle tank 22 is used as part of the filter system 18 for a fish aquarium 10. More desirably, the height h can range from between about 15 to about 22 inches when the baffle tank 22 is used as part of the filter system 18 for a fish aquarium 10. Even more desirably, the height $h_1$ can range from between about 16 to about 20 inches when the baffle tank 22 is used as part of the filter system 18 for a fish aquarium 10.

The reason for the above ranges is that many filter systems for aquariums 10 are situated within a wooden or metal cabinet 12 located below the aquarium. Sometimes, the aquarium 10 rest on a stand or on the cabinet 12 such that the stand or cabinet 12 provides support for the aquarium 10. The cabinet 12 can be designed and constructed to appear similar to a fine piece of furniture having one or more hinged doors 14, 14. The cabinet 12 may also be decorated or include fancy trim pieces. By placing the filter system 18 within the cabinet 12, one can hide the filter system 18 yet have easy access to it through the hinged doors 14, 14.

Figure 13:
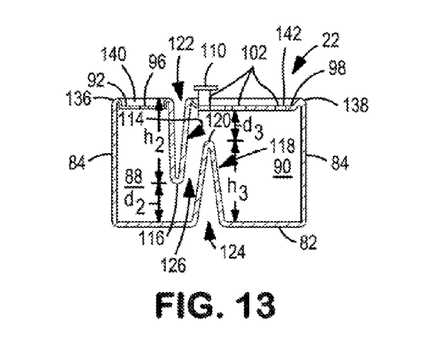
FIG. 13 is a cross-sectional view of the baffle tank shown in FIG. 10 taken along line 13-13.

Referring now to FIG. 13, the baffle tank 22 further includes a first baffle 114. The first baffle 114 is integrally formed by at least a portion of the sidewall 84 of the first chamber 88. By "baffle" it is meant a static device that regulates the flow of a fluid. The first baffle 114 is secured to at least a portion of the sidewall 84 which also forms the second chamber 90. Desirably, the first baffle 114 extends across the inner diameter or width $w_1$ of the baffle tank 22. The first baffle 114 extends downward from the top wall 92 of the first chamber 88 and has a lower end 116 positioned above the bottom wall 82. The first baffle 114 has a height $h_2$. The height $h_2$ of the first baffle 114 can vary. The height $h_2$ of the first baffle 114 can range from between about 3 inches to about 25 inches when the baffle tank 22 is used as part of the filter system 18 for a fish aquarium 10. Desirably, the height $h_2$ of the first baffle 114 can range from between about 5 to about 20 inches when the baffle tank 22 is used as part of the filter system 18 for a fish aquarium 10. More desirably, the height $h_2$ of the first baffle 114 can range from between about 8 to about 18 inches when the baffle tank 22 is used as part of the filter system 18 for a fish aquarium 10. Even more desirably, the height $h_2$ of the first baffle 114 can range from between about 9 to about 15 inches when the baffle tank 22 is used as part of the filter system 18 for a fish aquarium 10.

The first baffle 114 extends downward from the top wall 92 but stops short of the bottom wall 82. This distance can vary. For a baffle tank 22 having a height h of about 18 inches, the first baffle 114 should extend downward from the top wall 92 of the first chamber 88 a distance equal to at least about 40% of the height h of the baffle tank 22. Desirably, the first baffle 114 should extend downward from the top wall 92 of the first chamber 88 a distance equal to at least about 50% of the height h of the baffle tank 22. More desirably, the first baffle 114 should extend downward from the top wall 92 of the first chamber 88 a distance equal to at least about 60% of the height h of the baffle tank 22. Even more desirably, the first baffle 114 should extend downward from the top wall 92 of the first chamber 88 a distance equal to at least about 70% of the height h of the baffle tank 22.

The lower end 116 of the first baffle 114 is positioned a distance $d_2$ above the bottom wall 82. The distance $d_2$ can vary. The lower end 116 of the first baffle 114 should be spaced a distance $d_2$ of at least about 3 inches away from the bottom wall 82 when the baffle tank 22 is used as part of the filter system 18 for a fish aquarium 10. Desirably, the lower end 116 of the first baffle 114 should be spaced a distance $d_2$ of at least about 4 inches away from the bottom wall 82 when the baffle tank 22 is used as part of the filter system 18 for a fish aquarium 10. More desirably, the lower end 116 of the first baffle 114 should be spaced a distance $d_2$ of at least about 4 inches away from the bottom wall 82 when the baffle tank 22 is used as part of the filter system 18 for a fish aquarium 10. Even more desirably, the lower end 116 of the first baffle 114 should be spaced a distance $d_2$ of at least about 5 inches away from the bottom wall 82 when the baffle tank 22 is used as part of the filter system 18 for a fish aquarium 10.

Still referring to FIG. 13, the baffle tank 22 further includes a second baffle 118. The second baffle 118 is integrally formed with at least a portion of the sidewall 84 of the second chamber 90. The second baffle 118 is completely formed within the second chamber 90. The second baffle 118 extends across the inner diameter or width $w_2$ of the baffle tank 22. The second baffle 118 extends upward from the bottom wall 82 and has an upper end 120 positioned below the top wall 98 of the second chamber 90. The second baffle 118 is also aligned approximately parallel to the first baffle 114. Desirably, the second baffle 118 is aligned parallel to the first baffle 114. The second baffle 118 is spaced apart from the first baffle 114. The distance the first and second baffles, 114 and 118 respectively, are spaced apart from one another can vary. Typically, the first and second baffles, 114 and 118 respectively, can be spaced at least about 0.5 inches apart when the baffle tank 22 is used as part of the filter system 18 for a fish aquarium 10. Desirably, the first and second baffles, 114 and 118 respectively, can be spaced at least about 1 inch apart when the baffle tank 22 is used as part of the filter system 18 for a fish aquarium 10. More desirably, the first and second baffles, 114 and 118 respectively, can be spaced at least about 1.5 inches apart when the baffle tank 22 is used as part of the filter system 18 for a fish aquarium 10. Even more desirably, the first and second baffles, 114 and 118 respectively, can be spaced more than about 2 inches apart when the baffle tank 22 is used as part of the filter system 18 for a fish aquarium 10.

The second baffle 118 has a height $h_3$. The height $h_3$ of the second baffle 118 can vary. The height $h_3$ of the second baffle 118 can be less than, equal to or be greater than the height $h_2$ of the first baffle 114. Desirably, the height $h_3$ of the second baffle 118 is equal to or greater than the height $h_2$ of the first baffle 114. More desirably, the height $h_3$ of the second baffle 118 is greater than the height $h_2$ of the first baffle 114.

The height $h_3$ of the second baffle 118 can range from between about 3 inches to about 25 inches when the baffle tank 22 is used as part of the filter system 18 for a fish aquarium 10. Desirably, the height $h_3$ of the second baffle 118 can range from between about 5 to about 20 inches when the baffle tank 22 is used as part of the filter system 18 for a fish aquarium 10. More desirably, the height $h_3$ of the second baffle 118 can range from between about 8 to about 18 inches when the baffle tank 22 is used as part of the filter system 18 for a fish aquarium 10. Even more desirably, the height $h_3$ of the second baffle 118 can range from between about 9 to about 15 inches when the baffle tank 22 is used as part of the filter system 18 for a fish aquarium 10.

The second baffle 118 extends upward from the bottom wall 82 but stops short of the top wall 98. This distance can vary. For a baffle tank 22 having a height h of about 18 inches, the second baffle 118 should extend upward from the bottom wall 82 of the second chamber 90 a distance equal to at least about 40% of the height h of the baffle tank 22. Desirably, the second baffle 118 should extend upward from the bottom wall 82 of the second chamber 90 a distance equal to at least about 50% of the height h of the baffle tank 22. More desirably, the second baffle 118 should extend upward from the bottom wall 82 of the second chamber 90 a distance equal to at least about 60% of the height h of the baffle tank 22. Even more desirably, the second baffle 118 should extend upward from the bottom wall 82 of the second chamber 90 a distance equal to at least about 70% of the height h of the baffle tank 22.

The upper end 120 of the second baffle 118 is positioned a distance $d_3$ above the bottom wall 82. The distance $d_3$ can vary. The upper end 120 of the second baffle 118 should be spaced at least about 3 inches away from the top wall 98 when the baffle tank 22 is used as part of the filter system 18 for a fish aquarium 10. Desirably, the upper end 120 of the second baffle 118 should be spaced at least about 3.5 inches away from the top wall 98 when the baffle tank 22 is used as part of the filter system 18 for a fish aquarium 10. More desirably, the upper end 120 of the second baffle 118 should be spaced at least about 4 inches away from the top wall 98 when the baffle tank 22 is used as part of the filter system 18 for a fish aquarium 10. Even more desirably, the upper end 120 of the second baffle 118 should be spaced at least about 5 inches away from the top wall 98 when the baffle tank 22 is used as part of the filter system 18 for a fish aquarium 10.

Referring again to FIGS. 10 and 13, when viewed from the front, the first baffle 114 forms a groove 122 in the exterior surface of the baffle tank 22. The groove 122 can vary in shape. A V-shaped groove 122 is depicted. However, a groove 122 could be a U-shaped groove 122 or any other shape. The first baffle 114 extends downward from the top walls 92 and 98. Therefore, the groove 122 extends down from both of the top walls, 92 and 98. The first baffle 114 also forms a portion of a sidewall 84 to the first chamber 88 and a portion of a sidewall 84 to the second chamber 90. The sides of the first baffle 114 can be slightly bowed outward so that they exhibit a convex configuration. By "bow" it is meant bent, curved or arched. This slight bow facilitates removing the baffle tank 22 from the mold. The second baffle 118 forms an inverted groove 124 in the baffle tank 22. The inverted groove 124 can vary in shape. The inverted groove 124 can be a V-shaped groove, a U-shaped groove, etc. The second baffle 118 extends upward from the bottom wall 82. Therefore, the inverted groove 124 extends up from the bottom wall 82. The sides of the second baffle 118 can also be slightly bowed outward so that they exhibit a convex configuration. This slight bow facilitates removing the baffle tank 22 from the mold.

The pair of grooves 122 and 124 provides the baffle tank 22 with a unique visual exterior appearance. The pair of grooves 122 and 124 can be equal in size and appearance or can differ in size and appearance. Desirably, the pair of grooves 122 and 124 is identical in size and appearance.

Referring again to FIG. 13, one can clearly see that the grooves 122 and 124 extend completely across the width $w_1$ of the baffle tank 22.

In order to function properly and maintain a predetermined water level in the first chamber 88, the lower end 116 of the first baffle 114 is located closer to the bottom wall 82 than is the upper end 120 of the second baffle 118. The water level in the first chamber 88 will be dictated by the height $h_3$ of the upper end 120 of the second baffle 118 assuming sufficient water has been introduced into the first chamber 88. A basket or container, not shown, filled with a plurality of small, high surface area members, such as ceramic spherical balls, can be placed in the first chamber 88 to create a bacteria culture for biological filtration. By "ceramic" it is meant any of various hard, brittle, heat and corrosion resistant materials made by shaping and then firing a nonmetallic mineral, such as clay, at a high temperature. The incoming unclean, dirty or contaminated water from the aquarium 10 is directed downward so that it passes around and between these ceramic spherical balls. This action cleanses the contaminated fluid (water) of bacteria and other harmful chemicals, for example ammonia can be converted to less dangerous elements. The unique structure of the first and second baffles, 114 and 118 respectively, ensures that any basket or container, filled with such a bacteria culture, and present in the first chamber 88 will be completely submerged in water. This will be true even if the water level in the second chamber 90 goes down due to evaporation or some other reason. In essence, the first and second baffles, 114 and 118 respectively, control the fluid (water) level in the first chamber 88. In order for the biological filtration to work properly, the bacteria culture should be at least partially submerged in a fluid (water). Desirably, the bacteria culture should be completely submerged in a fluid (water).

Still referring to FIG. 13, it should be understood that the first and second chambers, 88 and 90 respectively, are fluidly connected via the first and second baffles, 114 and 118 respectively. The first and second chambers, 88 and 90 respectively, have an opening 126 located therebetween.

Still referring to FIG. 13, the lower end 116 of the first baffle 114 is positioned above the bottom wall 82 by a first distance $d_2$ and the upper end 120 of the second baffle 118 is positioned below the top wall 98 of the second chamber 90 by a second distance $d_3$. The first distance $d_2$ can be approximately equal to the second distance ds. Alternatively, the first distance $d_2$ can be greater than the second distance $d_3$. Another alternative is to have the first distance $d_2$ be less than the second distance $d_3$.

Figure 15:
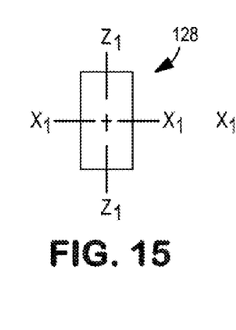
FIG. 15 is a top view of a piece of glass which can cover the enlarged opening formed in the first chamber of the baffle tank.
Figure 16:
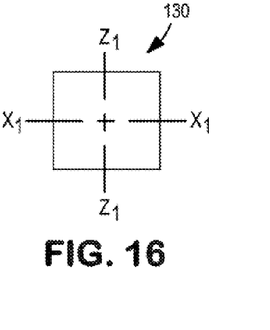
FIG. 16 is a top view of a piece of glass which can cover the enlarged opening formed in the second chamber of the baffle tank.

Referring now to FIGS. 15 and 16, first and second pieces of glass, 128 and 130 respectively, are shown. The first piece of glass 128 is sized and shaped to cover the enlarged opening 94 formed in the top wall 92 and cover the first chamber 88. The first piece of glass 128 is removable by lifting it upward and away from the enlarged opening 94. The second piece of glass 130 is sized and shaped to cover the enlarged opening 100 formed in the top wall 980 and cover the second chamber 90. The second piece of glass 130 is removable by lifting it upward and away from the enlarged opening 100.

One could use a different material other than glass, if one so desired. However, glass is a very common material that is relatively inexpensive, is resilient to water, comes in different thicknesses, can be cut into various shapes, has a certain weight to it so that it will remain in place on the top walls 92 and 98, and is washable should it get dirty.

The primary function of the first and second pieces of glass, 128 and 130 respectively, is to slow down, limit or prevent evaporation of water from the first and second chambers, 88 and 90 respectively.

The thickness of each of the first and second pieces of glass, 128 and 130 respectively, can vary. When the baffle tank 22 is used as part of the filter system 18 for a fish aquarium 10, the thickness of each of the first and second pieces of glass, 128 and 130 respectively, can range from between about 0.1 inches to about 0.5 inches. Desirably, the thickness of each of the first and second pieces of glass, 128 and 130 respectively, can range from between about 0.3 inches to about 0.4 inches. More desirably, the thickness of each of the first and second pieces of glass, 128 and 130 respectively, can be about 0.375 inches.

Referring again to FIG. 10, a first finger depression 132 is shown formed in the top wall 92, adjacent to the enlarged opening 94. The first finger depression 132 is optional but serves a very useful purpose. The first finger depression 132 facilitates removal of the piece of glass 128 from the enlarged opening 94. The first finger depression 132 can vary in size, shape and configuration but should be large enough to accommodate a person's index finger up to the first knuckle. Likewise, a second finger depression 134 is shown formed in the top wall 980, adjacent to the enlarged opening 100. The second finger depression 134 is again optional but serves a very useful purpose. The second finger depression 134 facilitates removal of the piece of glass 130 from the enlarged opening 100. The second finger depression 130 can vary in size, shape and configuration but should be large enough to accommodate a person's index finger up to the first knuckle.

Referring again to FIGS. 10 and 13, one will notice that the baffle tank 22 has a rim 136 which surrounds the top wall 92 of the first chamber 88 and a rim 138 which surrounds the top wall 98 of the second chamber 90. By "rim" it is meant a border, edge or margin of an object. The rims 136 and 138 function to create wells 140 and 142 in the top walls, 92 and 98 respectively. By "well" it is meant an enclosed space for receiving and holding something, such as water. The depth of each well 140 and 142 can vary. Desirably, each of the wells 140 and 142 has the same depth. Alternatively, the well 140 could have a different depth than the well 142. Any incoming water that does not pass through the inlet 96 but instead splashes on the top wall 92 of the first chamber 88 can pool in the well 140. This water would then be able to flow downward into first chamber 88 via the first finger depression 132. Likewise, any water that would accumulate on the top wall 98 of the second chamber 90 can pool in the well 142. This water would then be able to flow downward into second chamber 90 via the second finger depression 134.

Referring again to FIG. 2, as explained above, the filter system 18 includes at least one return conduit 106 for routing clean, filtered fluid (water) back to the container holding a large quantity of fluid (the aquarium) 10.

Referring again to FIGS. 10-12, one will notice that each of the sidewalls 84, 84, 84 and 84 has one or more structural members 150 to give it extra strength, integrity, rigidity and support. Optionally, at least one of the sidewalls 84 could have one or more structural members 150. Each of the structural members 150 can vary in size, shape and configuration. The structural members 150 are depicted as having a trapezoid shape. By "trapezoid" it is meant a quadrilateral having two parallel sides. Each structural member 150 is shown as being a large indentation formed in each of the sidewalls 84, 84, 84 and 84. However, it should be understood that each of the structural members 150 could be made to protrude outward from one or more of the sidewalls 84 and provide the same structural support. Still another option is to form the structural members 150 into unique shapes resembling one or more ribs, trusses, diagonal support beams, or a honeycomb design. Still a further option is to make the sidewalls 84, 84, 84 and 84 thicker so that the structural members 150 are not needed.

The pair of slits or V-shaped grooves 122 and 124 is not shown having a structural member 150. However, if needed, the sidewalls created by the V-shaped grooves 122 and 124 could also contain a structural member 150.

Referring now to FIG. 12, the baffle tank 22 further includes first and second abutments 152 and 154 in the first chamber 88. The first and second abutments, 152 and 154 respectively, can vary in size, shape and configuration. The abutments 152 and 154 can be molded into the baffle tank 22 as it is being formed. This means that the first and second abutments, 152 and 154 respectively, are integral with the baffle tank 22. Alternatively, the first and second abutments, 152 and 154 respectively, could be formed after the baffle tank 22 is formed or molded.

The first abutment 152 is spaced apart from the second abutment 154. The distance between the two abutments 152 and 154 can vary depending upon the size of the baffle tank 22. For a baffle tank 22 having a width w of about 16 inches, the distance between the first and second abutments, 152 and 154 respectively, could be about 6 inches or more. Desirably, for a baffle tank 22 having a width of about 16 inches, the distance between the first and second abutments, 152 and 154 respectively, could be about 7 inches or more. More desirably, for a baffle tank 22 having a width of about 16 inches, the distance between the first and second abutments, 152 and 154 respectively, could be at least about 8 inches.

Referring now to FIG. 11 when the abutments 152 and 154 are molded simultaneously with the baffle tank 22, a pair of recesses 156 and 158 can be created in the exterior, bottom wall 82 of the baffle tank 22. The recesses 156 and 158 decrease the amount of material that is needed to form the first and second abutments, 152 and 154 respectively. By forming the first and second abutments, 152 and 154 respectively, as hollow members, one can decrease the overall weight of the baffle tank 22.

Alternatively, the first and second abutments, 152 and 154 respectively, could be separate members that are affixed or secured to the interior of the bottom wall 82 after the baffle tank 22 is formed.

Referring again to FIG. 12, the first and second abutments, 152 and 154 respectively, are optional members that do not have to be present. The first and second abutments, 152 and 154 respectively, can vary in size, shape and configuration. In addition, one could utilize more than the two abutments 152 and 154, if needed. The first and second abutments, 152 and 154 respectively, can be of equal size or be of a different size. In FIG. 12, the first abutment 152 is shown to having a length $l_2$ and a width $w_2$. The length $l_2$ is aligned parallel to the longitudinal central axis $X_1$-$X_1$ of the baffle tank 22 and the width $w_2$ is aligned parallel to the transverse central axis $Z_1$-$Z_1$ of the baffle tank 22. Other arrangements are also possible. The length $l_2$ and the width $w_2$ of the first abutment 152 can vary. The length $l_2$ of the first abutment 152 can range from about 4 inches to about 7 inches when the baffle tank 22 is used as part of the filter system 18 for a fish aquarium 10. Desirably, the length $l_2$ of the first abutment 152 is from between about 5 inches to about 6 inches. More desirably, the length $l_2$ of the first abutment 152 is about 5.5 inches. The width $w_2$ of the first abutment 152 can range from between about 1 inch to about 3 inches when the baffle tank 22 is used as part of the filter system 18 for a fish aquarium 10. Desirably, the width $w_2$ of the first abutment 152 is about 2 inches.

Still referring to FIG. 12, a shoulder 160 is formed on the top of the first abutment 152, adjacent to the end located farthest away from the sidewall 84. The shoulder 160 can span across the width $w_2$ of the first abutment 152 and have a length of about 1 inch measured parallel to the length $l_2$ of the first abutment 152. The second abutment 154 is shown to having a length $l_3$ and a width $w_3$. The length $l_3$ is aligned parallel to the longitudinal central axis $X_1$-$X_1$ of the baffle tank 22 and the width $w_3$ is aligned parallel to the transverse central axis $Z_1$-$Z_1$ of the baffle tank 22. Other arrangements are also possible. The length $l_3$ and the width $w_3$ of the second abutment 154 can vary. The length $l_3$ of the second abutment 154 can range from about 4 inches to about 7 inches when the baffle tank 22 is used as part of the filter system 18 for a fish aquarium 10. Desirably, the length $l_3$ of the second abutment 154 is from between about 5 inches to about 6 inches. More desirably, the length $l_3$ of the second abutment 154 is about 5.5 inches. The width $w_3$ of the second abutment 154 can range from between about 1 inch to about 4 inches when the baffle tank 22 is used as part of the filter system 18 for a fish aquarium 10. Desirably, the width $w_3$ of the second abutment 154 is about 3 inches. One will notice that the second abutment 154 is wider than the first abutment 152. The purpose for this will be explained shortly. An L-shaped shoulder 162 is formed on the top of the second abutment 154. The L-shaped shoulder 162 can extend across the length $l_3$ and the width $w_3$ of the second abutment 154. The thickness of the L-shaped shoulder 162 can be about 1 inch or less.

Figure 17:
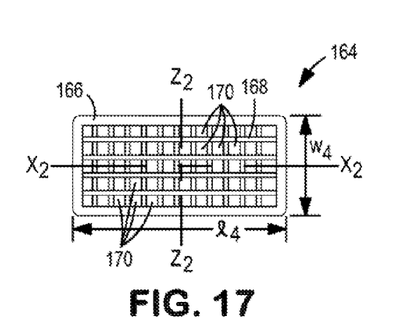
FIG. 17 is a top view of a basket which can rest on the abutments formed in the first chamber of the baffle tank.
Figure 18:
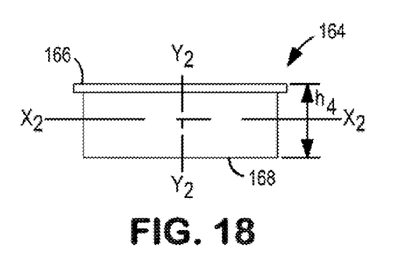
FIG. 18 is a side view of the basket shown in FIG. 17.

Referring now to FIGS. 17 and 18, the first and second abutments, 152 and 154 respectively, function as support for at least one basket 164. When two or more baskets 164, 164 are present, they can be stacked vertically, one on top on another in a nesting relationship. One, two, three, four, five, six or more basket(s) 164 can be utilized depending upon their size, shape and configuration, and the overall height of the baffle tank 22. A rectangular basket 164 is shown in FIGS. 17 and 18 although the basket(s) 164 can vary in size, shape and configuration. The basket(s) 164 can be constructed from various materials. Plastic is a good material from which to construct the basket(s) 164 because plastic is easily molded, is relatively inexpensive, is light weight, and will not rust or corrode when immersed in water.

The basket 164 has a length $l_4$, a width $w_4$ and a height $h_4$, all of which can vary. The length $l_4$ can range from between about 6 inches to about 20 inches depending on the size of the baffle tank 22. A length $l_4$ of from between about 9 inches to about 12 inches works well for a baffle tank 22 having a width of about 16 inches. The width $w_4$ can range from between about 3 inches to about 6 inches depending on the size of the baffle tank 22. A width $w_4$ of from between about 4 inches to about 5 inches works well for a basket 164 having a length $l_4$ of less than about 12 inches. The height $h_4$ can range from between about 1.5 inches to about 4 inches depending on the size of the baffle tank 22. A height $h_4$ of from between about 2 inches to about 3 inches works well for a basket 164 having a length $l_4$ of less than about 12 inches.

Still referring to FIGS. 17 and 18, the basket 164 has an upper lip 166 that extends completely around it outer perimeter. The width and thickness of the lip 166 can vary. A width of about 0.25 inches or less and a thickness of about 0.125 inches or less, works well. The basket 164 also has a bottom 168 with multiple openings 170 formed therethrough. The openings 170 can vary in size and shape. Desirably, all of the openings 170 are of the same size or diameter. The openings 170 are shown in FIG. 18 as square openings, although they could be circular. The openings 170 can be formed by various ways known to those skilled in the art. The openings 170 can be formed when the basket 164 is molded. Alternatively, the four sidewalls of the basket 164 could be formed and then a screen (not shown) could be attached to the sidewalls to form a perforated bottom 168.

The basket 164 is sized, shaped and configured to span across the pair of first and second abutments, 152 and 154 respectively. The shoulder 160 formed on the first abutment 152 and the L-shaped shoulder 162 formed on the second abutment 154 serve to hold the lower most basket 164 stationary so that it will not move as water is introduced into the first chamber 88. The nesting relationship between two or more vertically stacked baskets 164, 164 will cause all of the baskets 164, 164 to remain stationary.

Each basket 164 will hold a plurality of small, high surface area members, such as ceramic spherical balls, that will create a bacteria culture for biological filtration in the first chamber 88. The high surface area members are sometimes referred to as the biological filtration medium.

Optionally, an open cell foam member (not shown) and/or a perforated plate (not shown) can be placed in the upper most basket 164 to help prevent debris and other refuse from contacting the ceramic balls retained in the one or more baskets 164. A stack of two or more baskets 164, 164 is referred to as a media stack or a biological filtration stack by those in the filtering business.

Referring again to FIG. 10, the baffle tank 22 can optionally include at least one pre-formed pilot dimple 172. The pre-formed pilot dimples 172 serve as measured locations where openings can be drilled or created into the baffle tank 22 such that connecting hoses can be attached in a horizontal alignment between the baffle tank 22 and another tank, for example, the reservoir tank 24, in the filter system 18. With connecting hoses between adjacent tanks, sometimes it is critical that a hose be attached on the same horizontal plane between the two tanks. The pre-formed pilot dimples 172 provide an easy and convenient way for this to be accomplished. The pre-formed pilot dimples 172 can be formed anywhere in the exterior surface of the baffle tank 22. Desirably, the pre-formed pilot dimples 172 are formed in one or more of the sidewalls 84, 84, 84 and 84.

In FIG. 10, three pre-formed pilot dimples 172, 172 and 172 are shown formed in each of the sidewalls 84, 84, 84 and 84. Each of the pre-formed pilot dimples 172 facilitates drilling or forming a larger size opening in the baffle tank 22. The pre-formed pilot dimples 172 can be molded into the baffle tank 22 when it is being molded or the pre-formed pilot dimples 172 can be bored into the sidewall 84, 84, 84 and 84 or into the top walls 92 and 98 after the baffle tank 22 has been formed. Each of the pre-formed pilot dimples 172 has a diameter of about 0.25 inches or less. Desirably, each of the pre-formed pilot dimples 172 has a diameter of about 0.2 inches or less. The depth of each of the pre-formed pilot dimples 172 can vary. A depth of less than about 0.3 inches for each pre-formed pilot dimple 172 is sufficient when the thickness of the sidewalls 84, 84, 84 and 84 and the top walls 92 and 98 of the baffle tank 22 are less than about 1 inch.

Figure 19:
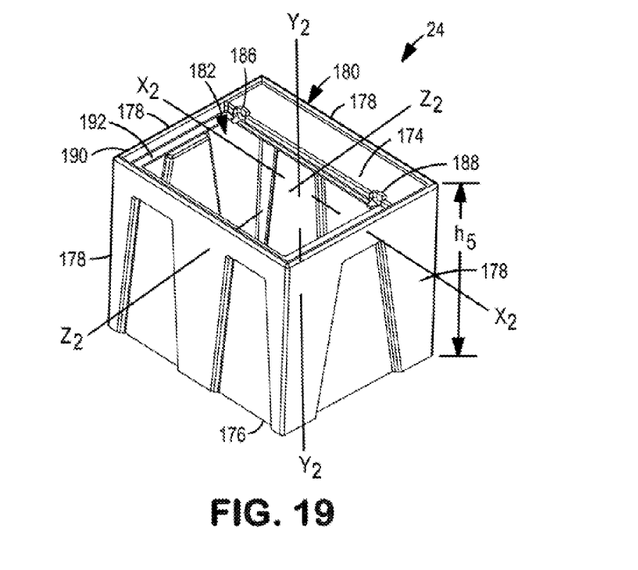
FIG. 19 is a perspective view of a reservoir tank.
Figure 20:
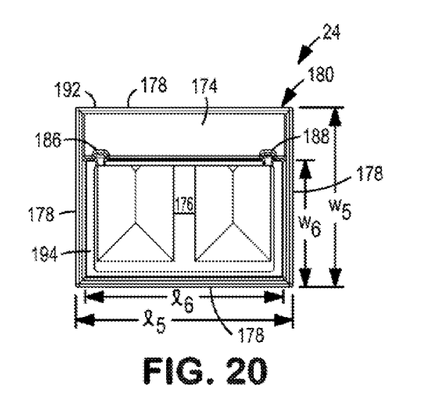
FIG. 20 is a top view of the reservoir tank shown in FIG. 19.

Referring now to FIGS. 2, 19 and 20, the filter system 18 may optionally include a reservoir tank 24. The reservoir tank 24 can be used to compliment the sock tank 20 and the baffle tank 22. Alternatively, the reservoir tank 24 can be used as an evaporation tank, a stand-alone sump, a feeder fish tank, a refugium, or simply as a reservoir for water that can be added to the aquarium 10. By "refugium" it is meant an area that has escaped ecological changes occurring elsewhere and so provides a suitable habitat for relict species.

The size, shape and configuration of the reservoir tank 24 can vary. The reservoir tank 24 can be an integral member. By "integral" it is meant a complete unit, a whole. The reservoir tank 24 can be constructed in any manner known to those skilled in the art. For example, the reservoir tank 24 can be molded as an integral member, can be assembled from individual parts, be cast, be carved from a single member, etc. Desirably, the reservoir tank 24 is molded using various molding techniques well known to those skilled in the molding arts. When molded, the reservoir tank 24 will exhibit a one piece design with no seams, joins or welds. This is advantageous for it eliminates the possibility of having fluid leak out of the reservoir tank 24. A molding apparatus that works well in molding the reservoir tank 24 is a rotational mold.

The reservoir tank 24 can be formed, molded or machined from any of the materials mentioned above with reference to the sock tank 20 and/or the baffle tank 22. Generally, the reservoir tank 24 will be molded from the same material used to mold the sock tank 20 and the baffle tank 22. Desirably, the reservoir tank 24 is molded from High Density Polyethylene (HDPE), High Density Polypropylene (HDPP), Low density Polyethylene (LDPE) or Low Density Polypropylene (LDPP). Other high or low density thermoplastics could also be used.

Still referring to FIGS. 19 and 20, the reservoir tank 24 has a top wall 174, a bottom wall 176 and at least one sidewall 178 joining the top wall 174 to the bottom wall 176 to form an enclosure 180. Four sidewalls 178, 178, 178 and 178 are shown giving the reservoir tank 24 a rectangular configuration. Any number of sidewalls 178 can be used. A single sidewall 178 would produce a circular enclosure 180, such as a cylinder. The bottom wall 176 can be secured to the at least one sidewall 178 in any manner known to those skilled in the art provided a water proof seal is formed. By "waterproof seal" it is meant impervious to or unaffected by water. Molding the reservoir tank 24 is most desirable. However, the bottom wall 176 could be secured to the at least one sidewall 178 using glue, an adhesive, a co-adhesive, a heat bond, a pressure bond, a heat and pressure bond, a weld, etc., or a combination of two or more of the aforementioned bonding techniques.

Referring to FIG. 19, the reservoir tank 24 has a longitudinal central axis $X_2$-$X_2$, a vertical central axis $Y_2$-$Y_2$, and a transverse central axis $Z_2$-$Z_2$. The reservoir tank 24 also has a length $l_5$, a width $w_5$ and a height $h_5$. The length $l_5$, the width $w_5$ and the height $h_5$ of the reservoir tank 24 can vary in dimension. The length $l_5$ can range from between about 18 inches to about 40 inches when the reservoir tank 24 is used as part of the filter system 18 for a fish aquarium 10. A length $l_5$ of less than about 30 inches works well when the reservoir tank 24 is used as part of the filter system 18 for a fish aquarium 10. Desirably, the length $l_5$ is about 25 inches when the reservoir tank 24 is used as part of the filter system 18 for a fish aquarium 10. The width $w_5$ can range from between about 10 inches to about 30 inches when the reservoir tank 24 is used as part of the filter system 18 for a fish aquarium 10. A width $w_5$ of less than about 25 inches works well when the reservoir tank 24 is used as part of the filter system 18 for a fish aquarium 10. Desirably, the width $w_5$ is about 20 inches when the reservoir tank 24 is used as part of the filter system 18 for a fish aquarium 10. The height $h_5$ can range from between about 10 inches to about 40 inches when the reservoir tank 24 is used as part of the filter system 18 for a fish aquarium 10. Desirably, the height $h_5$ can range from between about 12 to about 30 inches when the reservoir tank 24 is used as part of the filter system 18 for a fish aquarium 10. More desirably, the height $h_5$ can range from between about 15 to about 25 inches when the reservoir tank 24 is used as part of the filter system 18 for a fish aquarium 10. Even more desirably, the height $h_5$ can range from between about 16 to about 22 inches when the reservoir tank 24 is used as part of the filter system 18 for a fish aquarium 10. It is advantageous to form the reservoir tank 24 such that it has a height $h_5$ approximately equal to the height $h_1$ of the baffle tank 22.

Still referring to FIGS. 19 and 20, the reservoir tank 24 also has an enlarged opening 182 formed therein. The enlarged opening 182 can vary in size, shape and configuration. The enlarged opening 182 is depicted as a rectangular opening although any shape is possible. As shown in FIG. 20, the enlarged opening 182 has a length $l_6$ and a width $w_6$. The length $l_6$ of the enlarged opening 182 can range from between about 6 inches to about 25 inches. Desirably, the length $l_6$ of the enlarged opening 182 is at least about 10 inches. More desirably, the length is of the enlarged opening 182 is about 15 inches. Even more desirably, the length $l_6$ of the enlarged opening 182 is about 16 inches. The width $w_6$ of the enlarged opening 182 can range from between about 5 inches to about 25 inches. Desirably, the width $w_6$ of the enlarged opening 182 is at least about 6 inches. More desirably, the width $w_6$ of the enlarged opening 182 is about 8 inches. Even more desirably, the width $w_6$ of the enlarged opening 182 is about 10 inches.

Figure 21:
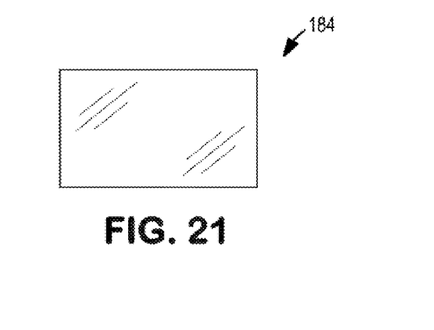
FIG. 21 is a top view of a piece of glass.

Referring to FIG. 21, a piece of glass 184 is sized and shaped to cover the enlarged opening 182. The piece of glass 184 is removable by lifting it upward and away from the enlarged opening 182. One could use a different material other than glass, if one so desired. However, glass is a very common material that is relatively inexpensive, is resilient to water, comes in different thicknesses, can be cut into various shapes, has a certain weight to it so that it will remain in place on the top wall 174, and is washable should it get dirty.

The primary function of the piece of glass 184 is to slow down, limit or prevent evaporation of water from the reservoir tank 24.

The thickness of the piece of glass 184 can vary. When the reservoir tank 24 is used as part of the filter system 18 for a fish aquarium 10, the thickness of the piece of glass 184 can range from between about 0.1 inches to about 0.5 inches. Desirably, the thickness of the piece of glass 184 can range from between about 0.2 inches to about 0.4 inches. More desirably, the thickness of the piece of glass 184 can be about 0.375 inches.

Referring again to FIGS. 19 and 20, the reservoir tank 24 a first finger depression 186 and a second finger depression 188 are shown formed in the top wall 174, adjacent to the enlarged opening 182. The first and second finger depressions, 186 and 188 respectively, are optional but they serve a very useful purpose. The first and second finger depressions, 186 and 188 respectively, facilitates removal of the piece of glass 184 from the enlarged opening 182. The first and second finger depressions, 186 and 188 respectively, can be spaced apart from one another by at least about 10 inches when the reservoir tank 24 is used as part of the filter system 18 for a fish aquarium 10. Desirably, the first and second finger depressions 186 and 188 respectively, are spaced apart from one another by at least about 12 inches when the reservoir tank 24 is used as part of the filter system 18 for a fish aquarium 10. More desirably, the first and second finger depressions 186 and 188 respectively, are spaced apart from one another by at least about 15 inches when the reservoir tank 24 is used as part of the filter system 18 for a fish aquarium 10. The first and second finger depressions 186 and 188 respectively, can vary in size, shape and configuration but should be large enough to accommodate a person's index finger up to the first knuckle. Alternatively, a single finger depression could be used.

Still referring to FIGS. 19 and 20, one will notice that the reservoir tank 24 has a rim 190 which surrounds the top wall 174. By "rim" it is meant a border, edge or margin of an object. The rim 190 functions to create a well 192 in the top wall 174. By "well" it is meant an enclosed space for receiving and holding something, such as water. The depth of the well 192 can vary. Desirably, the well 192 has a depth of less than about 1 inch when the reservoir tank 24 is used as part of the filter system 18 for a fish aquarium 10. The piece of glass 184 can be positioned in the well 192. Any water that is accidentally deposited on the top wall 174 of the reservoir tank 24 can pool in the well 192. This water would then be able to flow downward into the reservoir tank 24 via the first and/or second finger depressions 186 and/or 188 respectively.

Figure 22:
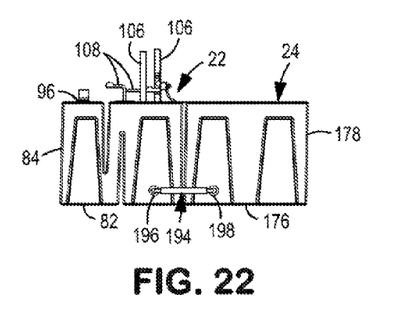
FIG. 22 is a side view of a baffle tank and a reservoir tank fluidly connected together by a second fluid connector.

Referring now to FIGS. 2 and 22, a second fluid connector 194 is shown which fluidly connects the baffle tank 22 and the reservoir tank 24. The reservoir tank 24 is capable of holding a larger volume of fluid that the second chamber 88 of the baffle tank 22. The second fluid connector 194 has a first end 196 and a second end 198. The first end 196 is attached to the at least one sidewall 84 of the baffle tank 22 at a location below the upper level of the fluid (water) in the second chamber 90. The second end 198 of the second fluid connector 194 is secured to the at least one sidewall 178 of the reservoir tank 24 at a location below the upper level of the fluid (water) in reservoir tank 24. The second fluid connector 194 is horizontally aligned such that the first and second ends, 196 and 198 respectively, reside in the same horizontal plane. This setup will ensure that the fluid level in both the baffle tank 22 and in the reservoir tank 24 are at the same height even though the actual fluid level can move up or down.

It should be noted that the first and second ends, 196 and 198 respectively, can attach to opening or holes that were formed where the pilot dimples 172, 172 were located. The pilot dimples 172, 172 can be very accurately positioned in the baffle tank 22 and in the reservoir tank 24 when the tanks, 22 and 24 were manufactured. The pre-formed, pilot holes 172, 172 thus ensure that the second fluid connector 194 is horizontally aligned between the two tanks 22 and 24.

Figure 23:
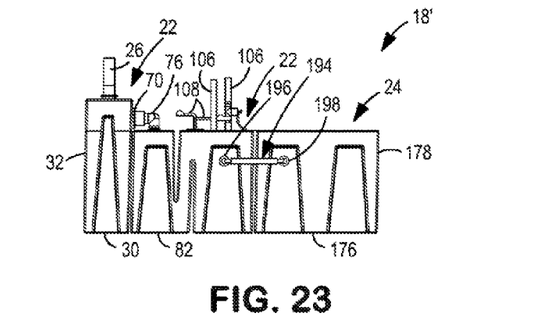
FIG. 23 is a side view of a sock tank, a baffle tank and a reservoir tank wherein the baffle tank and the reservoir tank are fluidly connected together by a second fluid connector positioned at an elevated height compared to its location in FIG. 22.

Referring now to FIG. 23, a side view of a filter system 18' is shown which includes a sock tank 20, a baffle tank 22 and a reservoir tank 24 is depicted with the baffle tank 22 and the reservoir tank 24 being fluidly connected together by the second fluid connector 194. The first end 196 of the second fluid connector 194 is attached to the at least one sidewall 84 of the baffle tank 22 at a location equal to the upper end 120 of the second baffle 118. This location is at the upper level of the fluid (water) in the second chamber 90. The second end 198 of the second fluid connector 194 is secured to the at least one sidewall 178 of the reservoir tank 24 at a location equal to the upper end 120 of the second baffle 118. This location is at the upper level of the fluid (water) in the second chamber 90. This means that the reservoir tank 24 can serve as a refugium or as a holding tank for small fish because the fluid (water) level in the reservoir tank 24 will not substantially decrease. The small fish can be used as a food source for the aquarium 10 where larger fish need fresh, live fish as food. The second fluid connector 194 is horizontally aligned such that the first and second ends, 196 and 198 respectively, reside in the same horizontal plane. However, in FIG. 23, the second fluid connector 194 is positioned at an elevated height compared to its location in FIG. 22.

Figure 24:
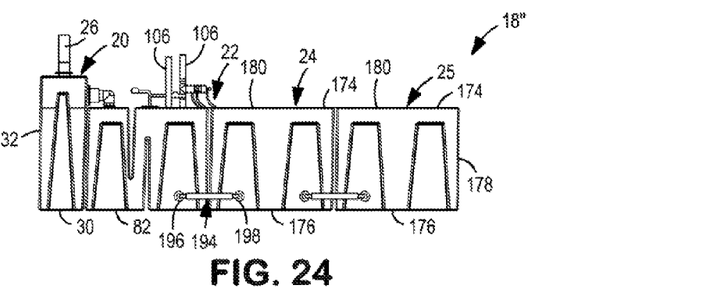
FIG. 24 is a side view of a filter system which includes a sock tank, a baffle tank and first and second reservoir tanks.

Referring to FIG. 24, a side view of a filter system 18" is shown which includes a sock tank 20, a baffle tank 22, and first and second reservoir tanks, 24 and 25 respectively. Each of the reservoir tanks 24 and 25 has a top wall 174, a bottom wall 176 and at least one sidewall 178 connecting the top wall 174 to the bottom wall 176 to form an enclosure 180. Each of the first and second reservoir tanks 24 and 25 respectively, is capable of holding a larger volume of fluid that the second chamber 88 of the baffle tank 22. The filter system 18" has a second fluid connector 194 secured at the same location as is shown in FIG. 22. In addition, the filter system 18" further includes a third fluid connector 200. The third fluid connector 200 has a first end 202 and a second end 204. The first end 202 is attached to the at least one sidewall 178 of the first reservoir tank 24 at a location below the upper level of the fluid (water) in the second chamber 88 of the baffle tank 22. The second end 204 of the third fluid connector 200 is secured to the at least one sidewall 178 of the second reservoir tank 25 at a location below the upper level of the fluid (water) in second chamber 90 of the baffle tank 22. The third fluid connector 200 is horizontally aligned such that the first and second ends, 202 and 204 respectively, reside in the same horizontal plane. In addition, the third fluid connector 200 is aligned in the same horizontal plane as the second fluid connector 194. This setup will ensure that the fluid level in the baffle tank 22 and in the first and second reservoir tanks, 24 and 25 respectively, will be at the same height even though the actual fluid level in all three tanks 22, 24 and 25 can move up or down.

It should be noted that the first and second ends, 202 and 204 respectively, of the third fluid connector 200 can be attach to opening or holes that are formed where the pilot dimples 172, 172 were located. The pilot dimples 172, 172 can be very accurately positioned in the baffle tank 22 and in the first and second reservoir tanks, 24 and 25 respectively, when the tanks 22, 24 and 25 were manufactured. The pre-formed, pilot holes 172, 172 thus ensure that the second fluid connector 194 and the third fluid connector 200 will be horizontally aligned between the three tanks 22, 24 and 25.

Figure 25:
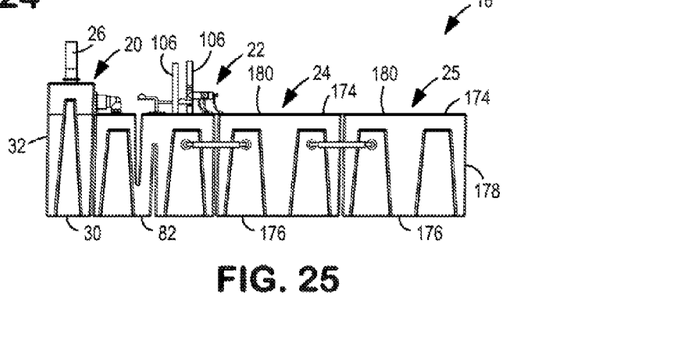
FIG. 25 is a side view of a filter system which includes a sock tank, a baffle tank and first and second reservoir tanks wherein the baffle tank and the first and second reservoir tanks are fluidly connected together by second and third fluid connector positioned at an elevated height compared to their location in FIG. 24.

Referring to FIG. 25, a sideview of another filter system 18''' is shown which includes a sock tank 20, a baffle tank 22, and first and second reservoir tanks, 24 and 25 respectively. Each of the reservoir tanks 24 and 25 has a top wall 174, a bottom wall 176 and at least one sidewall 178 connecting the top wall 174 to the bottom wall 176 to form an enclosure 180. Each of the first and second reservoir tanks 24 and 25 respectively, is capable of holding a larger volume of fluid that the second chamber 88 of the baffle tank 22. The filter system 18" in FIG. 25 differs from that shown in FIG. 24 in that the second and third fluid connectors, 24 and 25 respectively, are located at an elevated height compared to their locations in FIG. 23. Again, the second and third fluid connectors 194 and 200 are horizontally aligned with one another. In the filter system 18''', both of the first and second reservoir tanks, 24 and 25 respectively, can serve as refugiums or as holding tanks for small fish because the fluid (water) level in the reservoir tanks 24 and 25 will not substantially decrease. The small fish can be used as a food source for the aquarium 10 where larger fish need fresh, live fish as food.

While the invention has been described in conjunction with several specific embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A filter system for a fluid, comprising:
   a) a sock tank having a top wall, a bottom wall and at least one sidewall connecting said top wall to said bottom wall to form an enclosure, said top wall having an inlet formed therethrough which is fluidly connected to a container holding a large quantity of fluid, an outlet spaced apart from said inlet, a bracket secured to an interior surface of said sock tank, and a filter sock removable attached to said bracket and positioned adjacent to said inlet to provide particle filtration of incoming fluid;
   b) a first fluid connector having a first end attached to said outlet of said sock tank and a second end;
   c) a baffle tank having a bottom wall connected to at least one sidewall to form an enclosure, said baffle tank having a first chamber in fluid communication with a second chamber, said first chamber having a top wall connected to said at least one sidewall, an inlet which is aligned with said second end of said first fluid connector for receiving fluid in a non-sealing relationship, said first chamber containing a biological culture for biological filtration of said incoming fluid, said second chamber having a top wall connected to said at least one sidewall and having an outlet through which fluid can be routed back to said container holding a large quantity of fluid, said second chamber containing a quantity of filtered fluid, a first baffle formed by at least a portion of said sidewall of said first chamber, said first baffle joined to at least a portion of said sidewall of said second chamber, said first baffle extending downward from said top wall of said first chamber and having a lower end positioned above said bottom wall, a second baffle formed in said second chamber which extends upward from said bottom wall and has an upper end positioned below said top wall of said second chamber, said lower end of said first baffle is located closer to said bottom wall than is said upper end of said second baffle, and said first and second baffles allowing filtered fluid from said first chamber to flow into said second chamber while controlling fluid level in said first chamber; and
   d) a return conduit for routing filtered fluid from said second chamber of said baffle tank to said container holding a large quantity of fluid.

2. The filter system of claim 1 wherein said container holding a large quantity of fluid is an aquarium.

3. The filter system of claim 2 wherein a pump is positioned in said second chamber for pumping pressurized filtered fluid back to said aquarium.

4. The filter system of claim 1 wherein said sock tank and said baffle tank are each molded as a separate integral member.

5. The filter system of claim 1 wherein said inlet to said sock tank is formed in said top wall, said bracket has a U-shape, sock filter has an open end with a collar positioned adjacent to said open end, said collar sized to slide onto and off of said U-shaped bracket, and said U-shaped bracket holding said sock filter in alignment with said inlet to said sock tank.

6. The filter system of claim 5 wherein said collar has an inner periphery which contains a grasping member, and said grasping member facilitates carrying said sock filter in a vertical orientation.

7. The filter system of claim 5 wherein said sock filter is constructed of a porous material that can filter particles which are 100 microns or larger in size.

8. The filter system of claim 1 wherein said sock tank is constructed from one of the following: high density polyethylene, high density polypropylene, low density polyethylene or low density polypropylene.

9. The filter system of claim 1 wherein said inlet to said sock tank is formed in said top wall, and said outlet from said sock tank is aligned at about 90° to said inlet.

10. A filter system for a fluid, comprising:
    a) a sock tank having a top wall, a bottom wall and at least one sidewall connecting said top wall to said bottom wall to form an enclosure, said top wall having an inlet formed therethrough which is fluidly connected to a container holding a large quantity of fluid, an outlet spaced apart from said inlet, a bracket secured to an interior surface of said sock tank, and a filter sock removable attached to said bracket and positioned adjacent to said inlet to provide particle filtration of incoming fluid;
    b) a first fluid connector having a first end attached to said outlet of said sock tank, and a second end;
    c) a baffle tank having a bottom wall connected to at least one sidewall to form an enclosure, said baffle tank having a first chamber in fluid communication with a second chamber, said first chamber having a top wall connected to said at least one sidewall, an inlet which is aligned with said second end of said first fluid connector for receiving incoming fluid in a non-sealing relationship, said first chamber containing a biological culture for biological filtration of said incoming fluid, said second chamber having a top wall connected to said at least one sidewall and having an outlet through which fluid can be routed back to said container holding a large quantity of fluid, said second chamber containing a quantity of filtered fluid, a first baffle formed by at least a portion of said sidewall of said first chamber, said first baffle joined to at least a portion of said sidewall of said second chamber, said first baffle extending downward from said top wall of said first chamber and having a lower end positioned above said bottom wall, a second baffle formed in said second chamber which extends upward from said bottom wall and has an upper end positioned below said top wall of said second chamber, said lower end of said first baffle is located closer to said bottom wall than is said upper end of said second baffle, and said first and second baffles allowing filtered fluid from said first chamber to flow into said second chamber and establish an upper level of fluid in said second chamber while controlling fluid level in said first chamber;
    d) a second fluid connector having a first end attached to said at least one sidewall of said baffle tank at a location below said upper fluid level in said second chamber, and a second end;
    e) a reservoir tank having a top wall, a bottom wall and at least one sidewall connecting said top wall to said bottom wall to form an enclosure, said reservoir tank capable of holding a larger volume of fluid that said second chamber of said baffle tank, and said second end of said second fluid connector being horizontally secured to said at least one sidewall of said reservoir tank at a location below said upper level of fluid in said second chamber; and
    f) a return conduit for routing filtered fluid from said second chamber of said baffle tank to said container holding a large quantity of fluid.

11. The filter system of claim 10 wherein said container holding a large quantity of fluid is a fish aquarium, and each of said sock, baffle and reservoir tanks has an enlarged opening formed in said respective top walls which provides access to each of said tanks, and each of said enlarged openings is covered by a removable piece of glass to limit evaporation of said fluid from each of said tanks.

12. The filter system of claim 11 wherein a pump is positioned in said baffle tank for pumping pressurized filtered fluid back to said container holding a large quantity of fluid.

13. The filter system of claim 11 wherein said sock tank is molded in a rotational mold from one of the following: high density polyethylene, high density polypropylene, low density polyethylene or low density polypropylene.

14. The filter system of claim 11 wherein said inlet to said sock tank is formed in said top wall, said bracket has a U-shape, said sock filter has an open end with a collar positioned adjacent to said open end, said collar sized to slide onto and off of said U-shaped bracket, and said U-shaped bracket holding said sock filter in vertical alignment with said inlet to said sock tank.

15. The filter system of claim 14 wherein said sock filter is constructed of a porous material that can filter particles of a predetermined size or larger, said collar has an inner periphery which contains a grasping member, and said grasping member facilitates carrying said filter sock in a vertical orientation.

16. A filter system for a fluid, comprising:
    a) a sock tank having a top wall, a bottom wall and at least one sidewall connecting said top wall to said bottom wall to form an enclosure, said top wall having an inlet formed therethrough which is fluidly connected to a container holding a large quantity of fluid, an outlet spaced apart from said inlet, a bracket secured to an interior surface of said sock tank, and a filter sock removable attached to said bracket and positioned adjacent to said inlet to provide particle filtration of incoming fluid;
    b) a first fluid connector having a first end attached to said outlet of said sock tank, and a second end;
    c) a baffle tank having a bottom wall connected to at least one sidewall to form an enclosure, said baffle tank having a first chamber in fluid communication with a second chamber, said first chamber having a top wall connected to said at least one sidewall, an inlet which is aligned with said second end of said first fluid connector for receiving incoming fluid in a non-sealing relationship, said first chamber containing a biological culture for biological filtration of said incoming fluid, said second chamber having a top wall connected to said at least one sidewall and having an outlet through which fluid can be routed back to said container holding a large quantity of fluid, said second chamber containing a quantity of filtered fluid, a first baffle formed by at least a portion of said sidewall of said first chamber, said first baffle joined to at least a portion of said sidewall of said second chamber, said first baffle extending downward from said top wall of said first chamber and having a lower end positioned above said bottom wall, a second baffle formed in said second chamber which extends upward from said bottom wall and has an upper end positioned below said top wall of said second chamber, said lower end of said first baffle is located closer to said bottom wall than is said upper end of said second baffle, and said first and second baffles allowing filtered fluid from said first chamber to flow into said second chamber and establish an upper level of fluid in said second chamber while controlling fluid level in said first chamber;
    d) a second fluid connector having a first end attached to said at least one sidewall of said baffle tank at a location below said upper level of fluid in said second chamber, and a second end;
    e) a first reservoir tank having a top wall, a bottom wall and at least one sidewall connecting said top wall to said bottom wall to form an enclosure, said first reservoir tank capable of holding a larger volume of fluid that said second chamber of said baffle tank, and said second end of said second fluid connector being horizontally secured to said at least one sidewall of said first reservoir tank at a location below said upper level of fluid in said second chamber;

f) a third fluid connector having a first end attached to said first reservoir tank and a second end;

g) a second reservoir tank having a top wall, a bottom wall and at least one sidewall connecting said top wall to said bottom wall to form an enclosure, said second reservoir tank capable of holding a larger volume of fluid that said second chamber of said baffle tank, and said second end of said third fluid connector being horizontally secured to said at least one sidewall of said second reservoir tank at a location below said upper level of fluid in said second chamber; and h) a return conduit for routing filtered fluid from said second chamber of said baffle tank to said container holding a large quantity of fluid.

17. The filter system of claim 16 wherein said first and second reservoir tanks are formed from high density polyethylene.

18. The filter system of claim 16 wherein said baffle tank and said first and second reservoir tanks have approximately the same height.

19. The filter system of claim 16 wherein said sock tank has a height which is greater than said baffle tank.

20. The filter system of claim 16 wherein said each of said sock, baffle and first and second reservoir tanks have an enlarged opening formed in said respective top walls which provides access to each tank, and each of said enlarged openings is covered by a removable piece of glass to limit evaporation of said fluid from each of said tanks.

* * * * *